United States Patent
Sugiyama

(10) Patent No.: US 8,769,325 B2
(45) Date of Patent: Jul. 1, 2014

(54) METHOD AND APPARATUS FOR CONTROLLING POWER MODE SHIFTING OF AN IMAGE PROCESSING APPARATUS BY MONITORING ONLINE STATUS OF A PLURALITY OF CLIENT DEVICES EXTRACTED TO BE MONITORED BASED ON ITS POSITION INFORMATION AND ITS USAGE HISTORY

(75) Inventor: Hiroki Sugiyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 299 days.

(21) Appl. No.: 13/177,911

(22) Filed: Jul. 7, 2011

(65) Prior Publication Data

US 2012/0011385 A1 Jan. 12, 2012

(30) Foreign Application Priority Data

Jul. 9, 2010 (JP) ................................. 2010-156786

(51) Int. Cl.
*G06F 1/00* (2006.01)
*G06F 1/32* (2006.01)
*B41J 29/38* (2006.01)

(52) U.S. Cl.
CPC .. *G06F 1/32* (2013.01); *B41J 29/38* (2013.01)
USPC ........... 713/323; 358/1.1; 358/1.14; 358/1.15

(58) Field of Classification Search
CPC .................................. G06F 1/32; B41J 29/38
USPC .................... 713/323; 358/1.1, 1.14, 1.15
See application file for complete search history.

(56) References Cited

U.S. PATENT DOCUMENTS

| 2002/0097423 A1 | 7/2002 | Qiao | |
|---|---|---|---|
| 2004/0057069 A1 | 3/2004 | Ikeda | |
| 2004/0263896 A1 * | 12/2004 | Nagata et al. | 358/1.14 |
| 2009/0051958 A1 | 2/2009 | Ito | |
| 2010/0218017 A1 * | 8/2010 | Kitajima | 713/320 |
| 2010/0332879 A1 * | 12/2010 | Nakata | 713/323 |

FOREIGN PATENT DOCUMENTS

| JP | 2005-301446 | 10/2005 |
|---|---|---|
| JP | 2009-045860 | 3/2009 |
| JP | 2010-003083 | 1/2010 |
| JP | 2010-81393 | 4/2010 |
| JP | 2010-97479 | 4/2010 |

OTHER PUBLICATIONS

Japanese Office Action mailed Apr. 15, 2012 in corresponding Japanese Patent Application No. 2010-156786.

* cited by examiner

*Primary Examiner* — Thomas Lee
*Assistant Examiner* — Xuxing Chen
(74) *Attorney, Agent, or Firm* — Edwards Wildman Palmer LLP; David G. Conlin; Steven M. Jensen

(57) ABSTRACT

Considering a position relation between client devices and an image processing apparatus, the image processing apparatus is appropriately shifted to a power saving mode. A position information storage portion stores information of a position relation between each of the client devices and the image processing apparatus, a monitored target extracting portion extracts, from among the client devices, a client device to be monitored whether or not to be online based on information including at least the information of the position relation, a status confirming portion confirms whether or not the client device extracted is online, a power saving mode shift judging portion judges whether or not to shift the image processing apparatus to a power saving mode based on a confirmation result, and a power controlling portion controls shifting to the power saving mode of the image processing apparatus based on a judgment result.

17 Claims, 7 Drawing Sheets

FIG. 3

| No | CLIENT DEVICE NAME | IP ADDRESS | MUTUAL POSITION INFORMATION | LAST JOB RECEIVED DATE AND TIME INFORMATION | INFORMATION OF ACCUMULATIVE NUMBER OF RECEIVING JOBS | MONITORED TARGET | ONLINE INFORMATION |
|---|---|---|---|---|---|---|---|
| 1 | PC1 | 192.168.0.11 | A | MAY 17, 2010 15:00 | 100 | Y | * |
| 2 | PC2 | 192.168.0.12 | A | MAY 16, 2010 15:00 | 50 | Y | — |
| 3 | PC3 | 192.168.0.13 | A | MAY 17, 2010 17:00 | 10 | Y | — |
| 4 | PC4 | 192.168.0.14 | B | MAY 17, 2010 15:00 | 100 | Y | * |
| 5 | PC5 | 192.168.0.15 | B | MAY 16, 2010 15:00 | 5 | N | — |
| ... | ... | ... | ... | ... | ... | ... | ... |
| 13 | PC13 | 192.168.0.23 | B | MAY 17, 2010 15:00 | 10 | Y | * |
| 14 | PC14 | 192.168.0.24 | C | MAY 17, 2010 17:00 | 10 | Y | * |
| 15 | PC15 | 192.168.0.25 | C | — | 0 | N | — |

Y: ONLINE MONITORED TARGET   N: OUT OF ONLINE MONITORED TARGET   *: ONLINE   —: OFFLINE OR POWER IS TURNED OFF

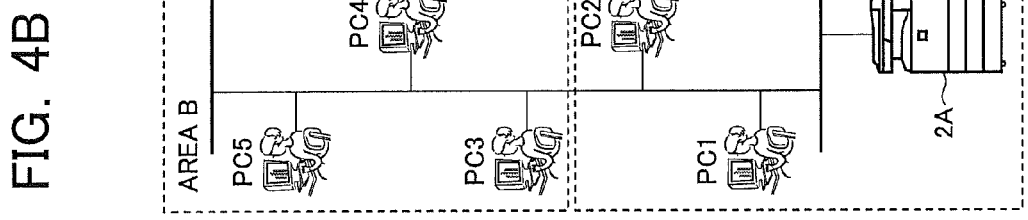
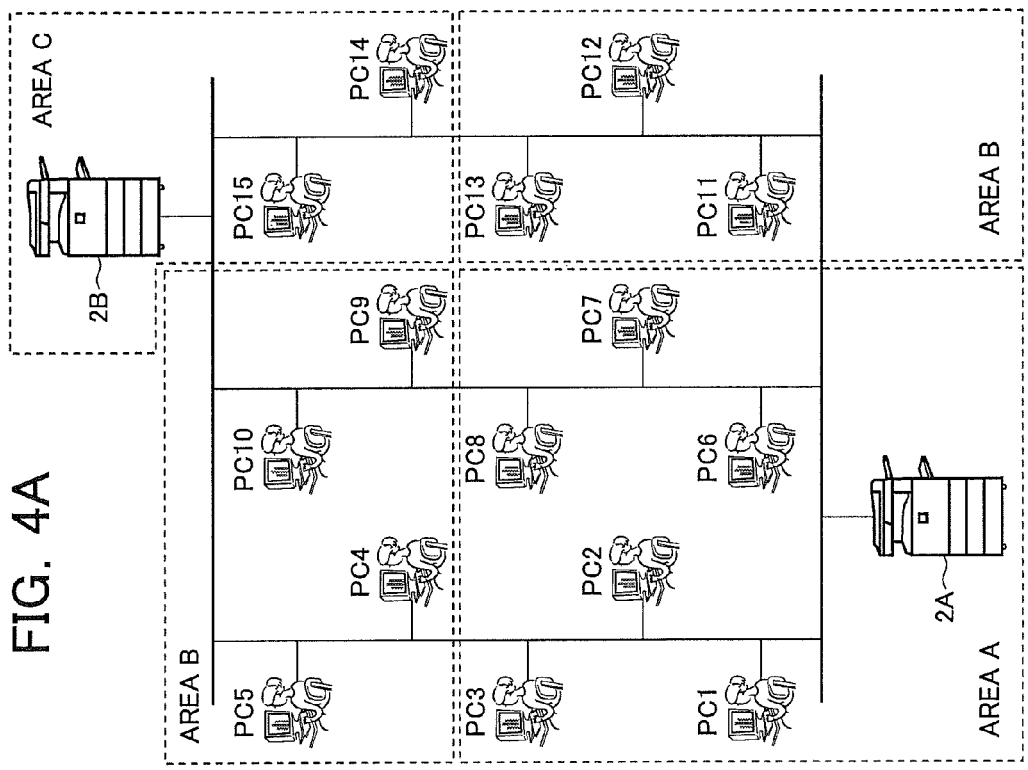

FIG. 5

| No | CLIENT DEVICE NAME | IP ADDRESS | MUTUAL POSITION INFORMATION | LAST JOB RECEIVED DATE AND TIME INFORMATION | INFORMATION OF ACCUMULATIVE NUMBER OF RECEIVING JOBS | MONITORED TARGET | ONLINE INFORMATION |
|---|---|---|---|---|---|---|---|
| 1 | PC1 | 192.168.0.11 | C | MAY 17, 2010 15:00 | 10 | Y→N | * |
| 2 | PC2 | 192.168.0.12 | C | MAY 16, 2010 15:00 | 10 | N | — |
| 3 | PC3 | 192.168.0.13 | B | MAY 17, 2010 17:00 | 10 | Y | — |
| 4 | PC4 | 192.168.0.14 | B | MAY 17, 2010 9:00 | 50 | Y | * |
| 5 | PC5 | 192.168.0.15 | B | MAY 16, 2010 15:00 | 10 | N | — |
| ... | ... | ... | ... | ... | ... | ... | ... |
| 13 | PC13 | 192.168.0.23 | A | MAY 16, 2010 15:00 | 50 | Y | * |
| 14 | PC14 | 192.168.0.24 | A | MAY 17, 2010 17:00 | 50 | Y | * |
| 15 | PC15 | 192.168.0.25 | A | MAY 17, 2010 12:00 | 100 | Y | — |

Y: ONLINE MONITORED TARGET   N: OUT OF ONLINE MONITORED TARGET   *: ONLINE   —: OFFLINE OR POWER IS TURNED OFF

METHOD AND APPARATUS FOR CONTROLLING POWER MODE SHIFTING OF AN IMAGE PROCESSING APPARATUS BY MONITORING ONLINE STATUS OF A PLURALITY OF CLIENT DEVICES EXTRACTED TO BE MONITORED BASED ON ITS POSITION INFORMATION AND ITS USAGE HISTORY

CROSS-NOTING PARAGRAPH

This non-provisional application claims priority under 35 U.S.C. §119(a) on Patent Application No. 2010-156786 filed in JAPAN on Jul. 9, 2010, the entire contents of which are hereby incorporated herein by reference.

FIELD OF THE INVENTION

The present invention relates to an image processing apparatus connected to a plurality of client devices through a network, an image processing system comprised of a plurality of client devices and an image processing apparatus connected to the plurality of client devices through a network, a power saving mode shift controlling method for controlling an image processing apparatus connected to a plurality of client devices through a network to shift to a power saving mode, a computer-readable recording medium having a computer program that realizes the power saving mode shift controlling method recorded therein, and a computer program that realizes the power saving mode shift controlling method, and relates to an image processing apparatus, an image processing system, a power saving mode shift controlling method, a computer-readable recording medium, and a computer program, that are suitably applied to a copier, a printer, a digital multi-functional peripheral or the like connected through a network.

BACKGROUND OF THE INVENTION

Conventionally, when a printing request is not provided from a client device for a predetermined time period, an image processing apparatus such as a printer generally shifts to a power saving mode appropriately. Such an invention is described in Japanese Laid-Open Patent Publication No. 2009-45860.

Specifically, Japanese Laid-Open Patent Publication No. 2009-45860 describes an image processing apparatus that transmits a response request signal to a specific client device having a predetermined usage amount or more among client devices connected through a network, and shifts to the power saving mode when judging that a reply corresponding to the response request signal is not transmitted from the client device for a predetermined time period.

However, according to the above-described image processing apparatus, since the response request signal is transmitted to the specific client device whose usage amount is merely not less than a predetermined threshold, there is a problem that it is difficult to shift to the power saving mode appropriately in such a case that there is a client device having a large usage amount temporarily in the past.

Specifically, it is generally considered that a client device that is physically apart from an image processing apparatus is unlikely to request a job to the image processing apparatus, however, there was a time when a usage amount of the client device was temporarily increased in the past and if that causes the usage amount to go over the predetermined threshold, a response request signal is also transmitted to the client device.

In addition, when the client device is online, a reply is generally provided corresponding to the response request signal, so that even when the client device is unlikely to request a job to the image processing apparatus at present or in the future, the image processing apparatus can not shift to the power saving mode due to a past temporal increase in the usage amount of the client.

SUMMARY OF THE INVENTION

An object of the present invention is to provide an image processing apparatus, an image processing system, a power saving mode shift controlling method, that are capable of appropriately shifting to a power saving mode considering a position relation with client devices, a computer-readable recording medium having a computer program that realizes the power saving mode shift controlling method recorded therein, and a computer program that realizes the power saving mode shift controlling method.

An object of the present invention is to provide an image processing apparatus connected to a plurality of client devices through a network, comprising: a position information storage portion for storing information of a position relation between each of the client devices and the image processing apparatus; a monitored target extracting portion for extracting, from among the client devices, a client device to be monitored whether or not to be online based on information including at least the information of the position relation; a status confirming portion for confirming whether or not the client device extracted by the monitored target extracting portion is online; a power saving mode shift judging portion for judging whether or not to shift the image processing apparatus to a power saving mode based on a confirmation result by the status confirming portion; and a power controlling portion for controlling shifting to the power saving mode of the image processing apparatus based on a judgment result by the power saving mode shift judging portion.

Another object of the present invention is to provide the image processing apparatus, further comprising a history storage portion for storing information of a usage history of each of the client devices, and wherein the monitored target extracting portion extracts a client device to be monitored from among the client devices based on the information of the position relation and the information of the usage history.

Another object of the present invention is to provide the image processing apparatus, wherein the information of the usage history includes information of a time when a last request of image processing was received from each of the client devices and information of the number of times a request of image processing was received from each of the client devices.

Another object of the present invention is to provide the image processing apparatus, wherein the monitored target extracting portion shares information of the client device to be monitored with other image processing apparatus connected through the network.

Another object of the present invention is to provide the image processing apparatus, wherein the monitored target extracting portion, when a client device to be monitored by the image processing apparatus and a client device to be monitored by the other image processing apparatus are duplicated, judges whether or not to exclude the client device that is duplicated from a monitored target.

Another object of the present invention is to provide the image processing apparatus, wherein the monitored target extracting portion, when a client device to be monitored by the image processing apparatus and a client device to be monitored by the other image processing apparatus are duplicated, judges whether or not to exclude the client device that is duplicated from a monitored target based on information of a position relation between each of the client devices and the image processing apparatus, information of a time when a last request of image processing was received from each of the client devices, and information of the number of times a request of image processing was received from each of the client devices.

Another object of the present invention is to provide the image processing apparatus, wherein the power controlling portion controls shifting to the power saving mode by controlling power supply and power-off for each element constituting the image processing apparatus based on information of an apparatus configuration of the image processing apparatus.

Another object of the present invention is to provide the image processing apparatus, further comprising a measuring portion for measuring a current time, and wherein the monitored target extracting portion changes a condition of extracting a client device to be monitored whether or not to be online based on information of a time measured by the measuring portion, and extracts a client device to be monitored whether or not to be online based on the changed condition.

Another object of the present invention is to provide the image processing apparatus, wherein the power saving mode shift judging portion judges whether or not to shift the image processing apparatus to the power saving mode based on an operating ratio of the client device extracted by the monitored target extracting portion.

Another object of the present invention is to provide the image processing apparatus, further comprising a power saving mode shift time storage portion for storing a previously set time before shifting to the power saving mode, and wherein when the operating ratio is not more than a previously set threshold, the power saving mode shift judging portion judges to shift the image processing apparatus to the power saving mode, and when the power saving mode shift judging portion judges to shift the image processing apparatus to the power saving mode, the power controlling portion controls the image processing apparatus to shift to the power saving mode even when the time stored in the power saving mode shift time storage portion has not elapsed.

Another object of the present invention is to provide an image processing system comprised of a plurality of client devices and an image processing apparatus connected to the plurality of client devices through a network, wherein the image processing apparatus comprising: a position information storage portion for storing information of a position relation between each of the client devices and the image processing apparatus; a monitored target extracting portion for extracting, from among the client devices, a client device to be monitored whether or not to be online based on information including at least the information of the position relation; a status confirming portion for confirming whether or not the client device extracted by the monitored target extracting portion is online; a power saving mode shift judging portion for judging whether or not to shift the image processing apparatus to a power saving mode based on a confirmation result by the status confirming portion; and a power controlling portion for controlling shifting to the power saving mode of the image processing apparatus based on a judgment result by the power saving mode shift judging portion.

Another object of the present invention is to provide a power saving mode shift controlling method for controlling shifting to a power saving mode of an image processing apparatus connected to a plurality of client devices through a network, comprising: a position information storage step of storing information of a position relation between each of the client devices and the image processing apparatus; a monitored target extracting step of extracting, from among the client devices, a client device to be monitored whether or not to be online based on information including at least the information of the position relation; a status confirming step of confirming whether or not the client device extracted at the monitored target extracting step is online; a power saving mode shift judging step of judging whether or not to shift the image processing apparatus to a power saving mode based on a confirmation result at the status confirming step; and a power controlling step of controlling shifting to the power saving mode of the image processing apparatus based on a judgment result at the power saving mode shift judging step.

Another object of the present invention is to provide the power saving mode shift controlling method, further comprising a history storage step of storing information of a usage history of each of the client devices, and wherein at the monitored target extracting step, a client device to be monitored is extracted from among the client devices based on the information of the position relation and the information of the usage history.

Another object of the present invention is to provide the power saving mode shift controlling method, wherein the information of the usage history includes information of a time when a last request of image processing was received from each of the client devices and information of the number of times a request of image processing was received from each of the client devices.

Another object of the present invention is to provide the power saving mode shift controlling method, wherein at the monitored target extracting step, information of the client device to be monitored is shared with other image processing apparatus connected through the network.

Another object of the present invention is to provide the power saving mode shift controlling method, wherein at the monitored target extracting step, when a client device to be monitored by the image processing apparatus and a client device to be monitored by the other image processing apparatus are duplicated, whether or not to exclude the client device that is duplicated from a monitored target is judged.

Another object of the present invention is to provide the power saving mode shift controlling method, wherein at the monitored target extracting step, when a client device to be monitored by the image processing apparatus and a client device to be monitored by the other image processing apparatus are duplicated, whether or not to exclude the client device that is duplicated from a monitored target is judged based on information of a position relation between each of the client devices and the image processing apparatus, information of a time when a last request of image processing was received from each of the client devices, and information of the number of times a request of image processing was received from each of the client devices.

Another object of the present invention is to provide the power saving mode shift controlling method, wherein at the power controlling step, shifting to the power saving mode is controlled by controlling power supply and power-off for each element constituting the image processing apparatus based on information of an apparatus configuration of the image processing apparatus.

Another object of the present invention is to provide the power saving mode shift controlling method, further comprising a measuring step of measuring a current time, and wherein at the monitored target extracting step, a condition of extracting a client device to be monitored whether or not to be online is changed based on information of a time measured at the measuring step, and a client device to be monitored whether or not to be online is extracted based on the changed condition.

Another object of the present invention is to provide the power saving mode shift controlling method, wherein at the power saving mode shift judging step, whether or not to shift the image processing apparatus to the power saving mode is judged based on an operating ratio of the client device extracted at the monitored target extracting step.

Another object of the present invention is to provide the power saving mode shift controlling method, further comprising a power saving mode shift time storage step of storing a previously set time before shifting to the power saving mode, and wherein at the power saving mode shift judging step, when the operating ratio is not more than a previously set threshold, it is judged to shift the image processing apparatus to the power saving mode, and when it is judged to shift the image processing apparatus to the power saving mode at the power saving mode shift judging step, the image processing apparatus is controlled to shift to the power saving mode at the power controlling step, even when the time stored at the power saving mode shift time storage step has not elapsed.

Another object of the present invention is to provide a recording medium that has a computer program that realizes the above-described power saving mode shift controlling method recorded therein and that is a computer-readable recording medium.

Another object of the present invention is to provide a computer program for causing a computer to execute the above-described power saving mode shift controlling method.

BRIEF DESCRIPTION OF THE DRAWINGS

FIG. 3 is a view for describing an example of a monitored target PC management list 31;

FIG. 4A is a view for describing area division of the position of the client devices (PC 1 to PC 15) based on each image processing apparatus 2A;

FIG. 4B is a view for describing area division of the position of the client devices (PC 1 to PC 15) based on each image processing apparatus 2B;

FIG. 5 is a view showing an example of a monitored target PC management list of the image processing apparatus 2B;

PREFERRED EMBODIMENTS OF THE INVENTION

Referring to drawings, embodiments of the present invention will hereinafter be described in detail. Note that, here, the embodiments will be described by pointing to a copier, a printer, a digital multi-functional peripheral or the like as an example of an image processing apparatus. However, the image processing apparatus is not limited thereto and may be other apparatuses.

Figure 1:
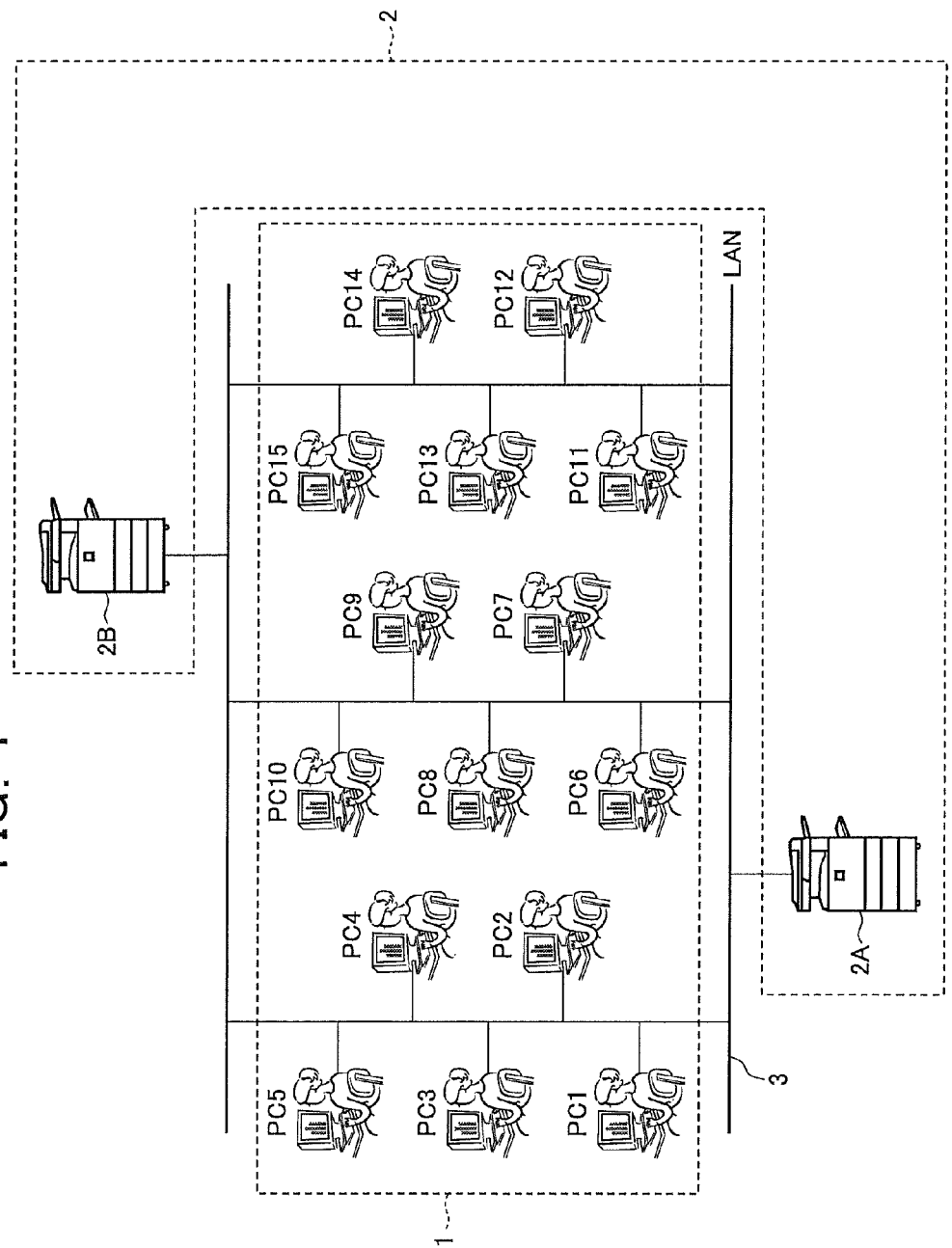
FIG. 1 is a view schematically showing an image processing system comprised of client devices (PC 1 to PC 15) and image processing apparatuses (2A and 2B) connected to the client devices (PC 1 to PC 15) through a LAN.

Firstly, an image processing system according to an embodiment of the present invention will be described with reference to FIG. 1. FIG. 1 is a view showing an image processing system comprised of client devices 1 (PC 1 to PC 15) and image processing apparatuses 2 (2A and 2B) connected to the client devices 1 (PC 1 to PC 15) through a LAN (Local Area Network) 3.

As shown in FIG. 1, the image processing apparatuses 2 (2A and 2B) are connected to the plurality of client devices 1 (PC 1 to PC 15) through the LAN 3. Note that, in the case where any of the image processing apparatuses are not distinguished, the "image processing apparatuses 2 (2A and 2B)" are collectively referred to as the "image processing apparatus 2" below. Further, also in the case where any of the client devices are not distinguished, the "client devices 1 (PC 1 to PC 15)" are collectively referred to as the "client device 1". In addition, the image processing apparatus 2 prints an image based on image data transmitted from each client device 1.

Figure 2:
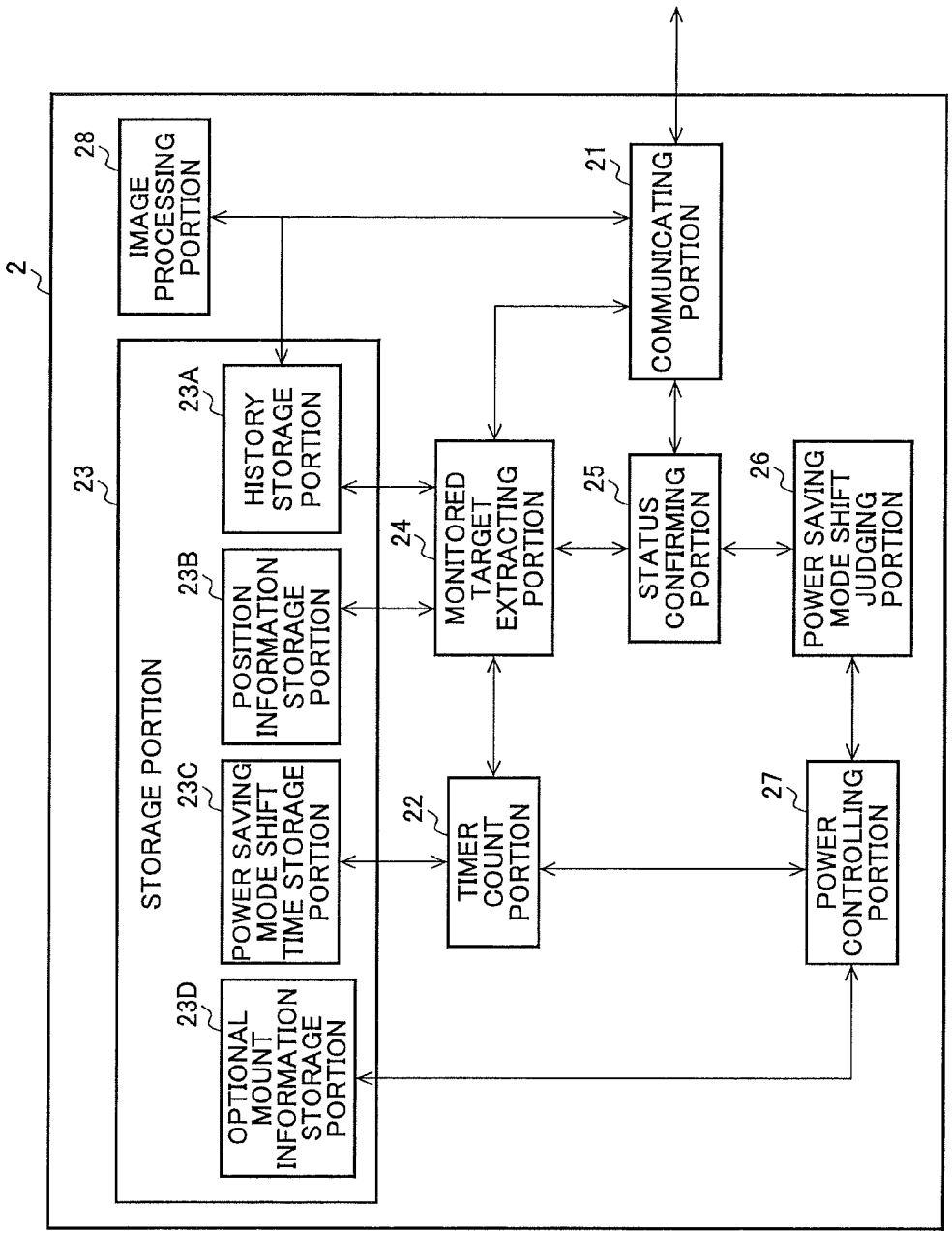
FIG. 2 is a functional block diagram of an image processing apparatus according to an embodiment of the present invention.

FIG. 2 is a functional block diagram of the image processing apparatus 2 according to an embodiment of the present invention. The image processing apparatus 2 is provided with a communicating portion 21, a timer count portion 22, a storage portion 23, a monitored target extracting portion 24, a status confirming portion 25, a power saving mode shift judging portion 26, a power controlling portion 27, and an image processing portion 28. The storage portion 23 is further provided with a history storage portion 23A, a position information storage portion 23B, a power saving mode shift time storage portion 23C, and an optional mount information storage portion 23D.

The communicating portion 21 performs communication with the client device 1 by packets in accordance with TCP/IP (Transmission Control Protocol/Internet Protocol) through the LAN 3. Moreover, the communicating portion 21, when receiving image data transmitted from the client device 1, transmits the data to the image processing portion 28. Further, with a request from the monitored target extracting portion 24, the communicating portion 21 acquires a monitored target PC management list 31 of other image processing apparatus. The monitored target PC management list 31 will be described below in detail. In addition, in response to a request from the status confirming portion 25, the communicating portion 21 transmits a response request signal to the specific client device 1.

The timer count portion 22 performs processing for measuring a time. The timer count portion 22 further judges whether or not a time up to shifting to a power saving mode has elapsed. This time is set by a user in advance. When the time up to shifting to the power saving mode has elapsed, then the timer count portion 22 notifies the monitored target extracting portion 24 and the power controlling portion 27 that the time has elapsed.

The storage portion 23 is a storage means such as a memory or a hard disc drive for storing various kinds of information. The storage portion 23 is provided with the history storage portion 23A, the position information storage portion 23B, the power saving mode shift time storage portion 23C, and the optional mount information storage portion 23D.

The history storage portion 23A stores information of a history of jobs requested to the image processing apparatus 2. The position information storage portion 23B stores information of a physical distance between the client device that requested a job to the image processing apparatus 2 and the image processing apparatus 2. Specifically, the history storage portion 23A and the position information storage portion 23B store each information correlating it to a name and an IP address of the client device 1, as the monitored target PC management list 31 whose example is shown in FIG. 3. Note that, the monitored target PC management list 31 may be stored as one file or stored in a state of being divided into a plurality of files.

The power saving mode shift time storage portion 23C stores a time up to shifting to the power saving mode. The time up to shifting to the power saving mode is set by a user in advance. The optional mount information storage portion 23D stores information of an option whose power needs to be turned on at all times (for example, a FAX unit or the like) among options mounted to the image processing apparatus 2.

Here, the monitored target PC management list 31 will be described with reference to FIG. 3. FIG. 3 is a view for describing an example of the monitored target PC management list 31. The monitored target PC management list 31 includes each information of a client device name 32, an IP address of a client device 33, mutual position information 34 showing a mutual position relation with a client device, last job received date and time information 35 showing a date and time that a last job was received from a client device, information of cumulative number of receiving jobs 36 showing cumulative number of receiving jobs from a client device, monitored target information 37 showing whether or not to be monitored with "Y" (to be monitored) or "N" (not to be monitored), and online information 38 showing whether or not a client device to be monitored is online with "*" (being online) or "-" (being offline or power is turned off).

Here, the mutual position information 34 is the information for specifying the position of client devices by area division of a physical distance from the image processing apparatus to client devices into A, B, and C in the order of distance from the image processing apparatus. The mutual position information 34 is set by a user in advance based on the physical distance from the image processing apparatus to client devices. FIG. 4A is a view for describing area division of the position of the client devices 1 (PC 1 to PC 15) based on the image processing apparatus 2A. FIG. 4B is a view for describing area division of the position of the client devices 1 (PC 1 to PC 15) based on the image processing apparatus 2B.

As shown in FIG. 4A, the client devices PC 1, PC 2, PC 3, PC 6, PC 7, and PC 8 belong to the area A where is close to the image processing apparatus 2A, and the client devices PC 4, PC 5, PC 9, PC 10, PC 11, PC 12, and PC 13 belong to the area B, and the client devices PC 14 and PC 15 belong to the area C.

The area division varies according to which image processing apparatus is taken as a base point. As shown in FIG. 4B, when the image processing apparatus 2B is taken as a base point, the client devices PC 8, PC 9, PC 10, PC 13, PC 14, and PC 15 belong to the area A where is physically close to the image processing apparatus 2B, and the client devices PC 3, PC 4, PC 5, PC 6, PC 7, PC 11, and PC 12 belong to the area B, and the client devices PC 1 and PC 2 belong to the area C.

In the present application, though three areas of A, B, and C are set for convenience of explanation, the area may be divided into smaller segments in an embodiment. Note that, as described below, the area division information is used to calculate a monitored target point showing a possibility that the image processing apparatuses 2A and 2B receive jobs from the client devices PC 1 to PC 15.

The last job received date and time information 35 is the information of date and time that the image processing apparatus received a last job from the client device 1. The last job received date and time is updated by the image processing portion 28 every time the image processing portion 28 receives image data.

Note that, as described below, the last job received date and time information 35 is compared to current time and date acquired from the timer count portion 22, and it is judged whether or not there is a high possibility that a job is received from the client device in the future based on whether or not a difference between the time and date that the last job was received and the current date and time has elapsed over a previously set time. Then, ranking is made such as a, b, and in order of lowering possibility. The ranked information is used to calculate a monitored target point showing a possibility that a job is received from the client device.

The information of cumulative number of receiving jobs 36 is information of cumulative number that the image processing apparatus received jobs from the client device 1 in the past. The information of cumulative number of receiving jobs 36 is updated by the image processing portion 28 every time the image processing portion 28 receives image data. Note that, as described below, depending on whether or not the information of cumulative number of receiving jobs 36 is not less than the number that is set in advance, it is judged whether or not there is a high possibility that a job is received from the client device aftertime. Then, ranking is made such as α, β, and γ in order of lowering possibility. The ranked information is used to calculate the monitored target point showing a possibility that a job is received from the client device.

The monitored target 37 is information showing whether or not an image processing apparatus monitors whether or not a corresponding client device is online. A field of a client device to be monitored is set to "Y", and a field of a client device not to be monitored is set to "N".

The online information 38 is information showing whether or not a client device to be monitored by the image processing apparatus is online. The case where a client device to be monitored is online is set to "*", and the case of being offline or where power is turned off is set to "-".

Note that, as described below, a condition of shifting to the power saving mode of the image processing apparatus is determined depending on whether or not an operating ratio is not more than a reference value that is set in advance. Here, the operating ratio is obtained as follows:

(Operating ratio)
=(total number of client devices being online among client devices to be monitored)/(total number of client devices to be monitored)
=(total number of client devices indicating "*" in online information 38)/(total number of client devices indicating "Y" in monitored target 37)

Returning to the description of FIG. 2, the monitored target extracting portion 24 extracts the client device 1 to be monitored using job receiving history information (last job received date and time 35 and information of cumulative number of receiving jobs 36) and the mutual position information 34 of the monitored target PC management list 31 stored in the storage portion 23.

Specifically, the monitored target extracting portion 24 ranks the possibility of receiving a job from a client device using the mutual position information 34, the last job received date and time information 35, and the information of cumulative number of receiving jobs 36 of the monitored target PC management list 31. The monitored target extracting portion 24 then extracts a client device to be monitored using a monitored target point obtained by showing each rank with a numerical point. Thereafter, the monitored target extracting portion 24 sets a field of the monitored target 37 of the client device to be monitored to "Y", and sets a field of the monitored target 37 of the client device not to be monitored to "N".

An example of a method for calculating a monitored target point will be shown below. Here, the mutual position information 34 of the monitored target PC management list 31 is divided into three areas of an area A, an area B, and an area C. In this case, for example, 1 point is given to a client device belonging to the area A, 0.5 point is given to a client device belonging to the area B, and 0.1 point is given to a client device belonging to the area C.

Moreover, as to ranking using the last job received date and time information 35 of the monitored target PC management list 31, for example, the possibility of receiving a job from a client device is ranked into any of a, b, and c based on the following conditions.

rank a: (last job received date and time)−(current date and time)=less than 12 hours rank b: (last job received date and time)−(current date and time)=12 hours or more and less than 24 hours rank c: (last job received date and time)−(current date and time)=24 hours or more In addition, 1 point, 0.5 point, and 0.1 point are given to the rank a, the rank b, and the rank c, respectively.

Further, as to ranking using the information of cumulative number of receiving jobs 36 of the monitored target PC management list 31, for example, the possibility of receiving a job from a client device is ranked into any of α, β, and γ based on the following conditions.

rank α: (cumulative number of receiving jobs)=50 times or more rank β: (cumulative number of receiving jobs)=10 times or more and less than 50 times rank γ: (cumulative number of receiving jobs)=less than 10 times In addition, 1 point, 0.5 point, and 0.1 point are given to the rank α, the rank β, and the rank γ, respectively.

The monitored target extracting portion 24 sets a client device whose sum of the point given in each element exceeds 1 point based on the above-described conditions as a monitored target. For example, calculation of the sum of the point of the client device PC 1 of the monitored target PC management list 31 shown in FIG. 3 is as follows:

1 point (area A)+1 point (less than 12 hours)+1 point (50 times or more)

=3 points

Note that, it is assumed that the current date and time is at 18:00, on May 17, 2010. Since the sum of the point exceeds 1, the client device PC 1 is set as a monitored target. Calculation of the sum of the point of the client device PC 5 is as follows:

0.5 point (area B)+0.1 point (24 hours or more)+0.1 point (less than 10 times)

=0.7 point

Accordingly, since the sum of the point does not exceed 1, the client device PC 5 is excluded from a monitored target.

In this manner, the monitored target extracting portion 24 calculates the sum of the point using information of the last job received date and time and the cumulative number of receiving jobs in addition to information of the area to which a client device belongs, and sets a client device to be monitored based on the calculation result, thus making it possible to extract a client device having a high possibility of requesting a job again more appropriately.

Further, in ranking using the last job received date and time information 35 of the monitored target PC management list 31, a condition of extracting a client device to be monitored is changed by a time difference between the last job received date and time and the current date and time, and a client device to be monitored is extracted based on the changed condition, thus making it possible to extract a client device having a high possibility of requesting a job again more appropriately.

Note that, when other image processing apparatus having the same function as that of the image processing apparatus 2 is connected to a network to which the image processing apparatus is connected, the monitored target extracting portion 24 acquires the monitored target PC management list 31 of the other image processing apparatus, and judges whether or not the image processing apparatus 2 and the other image processing apparatus regard the same client device as a monitored target. When it is judged that the same client device is regarded as a monitored target, the monitored target extracting portion 24 of the image processing apparatus whose monitored target point is lower performs processing for excluding the client device from a monitored target.

FIG. 5 is a view showing an example of a monitored target PC management list 41 of the image processing apparatus 2B. Here, as a specific example, processing for excluding a client device to be monitored will be described using the monitored target PC management list 31 of the image processing apparatus 2A shown in FIG. 3 and the monitored target PC management list 41 of the image processing apparatus 2B (corresponding to other image processing apparatus) shown in FIG. 5.

Since each information of a client device name 42, an IP address 43, mutual position information 44, last job received date and time information 45, information of cumulative number of receiving jobs 46, a monitored target 47, and online information 48 registered in the monitored target PC management list 41 of the image processing apparatus 2B shown in FIG. 5 is the same as each information of the client device name 32, the IP address 33, the mutual position information 34, the last job received date and time information 35, the information of cumulative number of receiving jobs 36, the monitored target 37, and the online information 38 registered in the monitored target PC management list 31 shown in FIG. 3, the description of which will be omitted.

In this example, both the image processing apparatuses 2A and 2B regard the client device PC 1 as a monitored target. In this case, calculation of the monitored target point of the client device PC 1 in the image processing apparatus 2A using the condition of giving a point described above and the monitored target PC management list 31 of FIG. 3 is as follows:

1 point (area A)+1 point (less than 12 hours)+1 point (50 times or more)

=3 points

Note that, it is assumed that the current date and time is at 18:00, on May 17, 2010.

In addition, calculation of the monitored target point of the client device PC 1 in the image processing apparatus 2B using the condition of giving a point described above and the monitored target PC management list 41 of FIG. 5 is as follows:

0.1 point (area C)+1 point (less than 12 hours)+0.5 point (10 times or more and less than 50 times)

=1.6 points

Accordingly, the monitored target point of the client device PC 1 of the image processing apparatus 2B is smaller than that of the client device PC 1 of the image processing apparatus 2A, so that the monitored target extracting portion 24 of the image processing apparatus 2B performs processing for excluding the client device PC 1 from a monitored target. To the contrary, when the monitored target point of the client device PC 1 of the image processing apparatus 2A is smaller than that of the client device PC 1 of the image processing apparatus 2B, the monitored target extracting portion 24 of the image processing apparatus 2A performs processing for excluding the client device PC 1 from a monitored target.

Note that, when the monitored target point of the client device to be monitored by the image processing apparatus 2A is the same as that of the client device to be monitored by the other image processing apparatus 2B, the monitored target extracting portion 24 of the image processing apparatus 2A and the monitored target extracting portion 24 of the other image processing apparatus 2B may not perform processing for excluding the client device PC 1 from a monitored target, or either the monitored target extracting portion 24 of the image processing apparatus 2A or the monitored target extracting portion 24 of the other image processing apparatus 2B may exclude the client device PC 1 from a monitored target according to some kind of standard. The standard may be such that, for example, the image processing apparatus 2 having a smaller numeric value showing an IP address is selected.

In this manner, the monitored target extracting portion 24 acquires the monitored target PC management list 41 of the other image processing apparatus 2B and the other processing apparatus 2B having the equal function to that of the image processing apparatus 2A also acquires the monitored target PC management list 31 of the image processing apparatus 2A and information of a client device to be monitored is shared with the other image processing apparatus 2B, so that it is possible to easily judge whether or not the image processing apparatus 2A and the other image processing apparatus 2B regard the same client device as a monitored target.

Moreover, when the client device to be monitored by the image processing apparatus 2A and the client device to be monitored by the other image processing apparatus 2B are duplicated and the monitored target point of the client device to be monitored by the image processing apparatus 2A is smaller than that of the client device to be monitored by the other image processing apparatus 2B, the monitored target extracting portion 24 excludes the client device to be monitored by the image processing apparatus 2A from a monitored target, so that it is possible to exclude the client device from the monitored target effectively and the image processing apparatus 2A is able to shift to the power saving mode appropriately.

That is, in the conventional technology, when the client device is being up, the client device transmits a response signal corresponding to a response request signal transmitted by each of the image processing apparatuses 2A and 2B, however, when the image processing apparatus 2A receives the response signal, even if the client device mainly uses the other image processing apparatus 2B and hardly uses the image processing apparatus 2A, it is judged that there is a possibility that a request to execute a job is received from the client device, thus leading an increase in an operating ratio, resulting that a case is considered that the image processing apparatus 2A can not shift to the power saving mode. However, since the client device to be monitored by the image processing apparatus 2A is excluded from a monitored target as described above, the image processing apparatus 2A becomes possible to shift to the power saving mode appropriately.

Returning to the description of FIG. 2, the status confirming portion 25 transmits a response request signal to the client device 1 that is extracted as a monitored target by the monitored target extracting portion 24 and confirms a presence/absence of a response signal corresponding to the response request signal. Specifically, the status confirming portion 25 confirms a presence/absence of a PING response to the specific client device. Note that, the method for confirming a presence/absence of a response signal is not limited thereto and other method may be used.

The status confirming portion 25, when receiving a response signal from the client device 1, judges that the client device is online. When not receiving a response signal within a predetermined time, the status confirming portion 25 judges that the client device is offline or power is turned off.

The power saving mode shift judging portion 26 uses the result of whether or not the client device to be monitored is online judged by the status confirming portion 25, to calculate an operating ratio of the client device to be monitored, and when the calculated operating ratio is not more than a previously set threshold, judges to shift to the power saving mode.

For example, the power saving mode shift judging portion 26, when the operating ratio is not more than 20%, judges to shift to the power saving mode. The power saving mode shift judging portion 26, when having judged to shift to the power saving mode, then transmits a power saving mode shift request signal to request the power controlling portion 27 to shift to the power saving mode.

In this manner, the power saving mode shift judging portion 26 judges whether or not to shift the image processing apparatus 2 to the power saving mode based on the operating ratio, so that it is possible to appropriately judge whether or not to shift to the power saving mode according to the ratio of the client device to be monitored that is online.

Here, even if the time count portion 22 judges that a time up to shifting to the power saving mode has not elapsed, when the operating ratio becomes not more than the previously set threshold, the power saving mode shift judging portion 26 judges to shift the image processing apparatus 2 to the power saving mode. This makes it possible to shift the image processing apparatus 2 to the power saving mode more quickly.

The power controlling portion 27, when receiving a power saving mode shift request signal from the power saving mode shift judging portion 26, performs processing for shifting the image processing apparatus 2 to the power saving mode. Further, the power controlling portion 27, when receiving notification that the time up to shifting to the power saving mode has elapsed from the timer count portion 22, controls the image processing apparatus 2 to shift to the power saving mode.

Note that, the image processing apparatus 2 is mounted with an option whose power needs to be turned on at all times (for example, a FAX unit or the like) in some cases. Accordingly, when such an option is mounted to the image processing apparatus 2, the power controlling portion 27 turns power off except for the option, even if the power saving mode shift request signal is received as a result of the judgment by the power saving mode shift judging portion 26. Here, the power controlling portion 27 reads out information of whether or not the option is mounted to the image processing apparatus 2 from the optional mount information storage portion 23D, thus making it possible to detect a presence/absence of mounting of the option.

In this manner, when an option whose power needs to be turned on at all times is mounted to the image processing apparatus 2, the power controlling portion 27 turns power off except for the option, so that it is possible for the image processing apparatus 2 to shift to the power saving mode safely.

The image processing portion 28 performs processing (such as printing) of image data received from the client device 1. Moreover, the image processing portion 28, when receiving image data from the client device 1, stores such recording in the storage portion 23 as a job received history.

Figure 6:
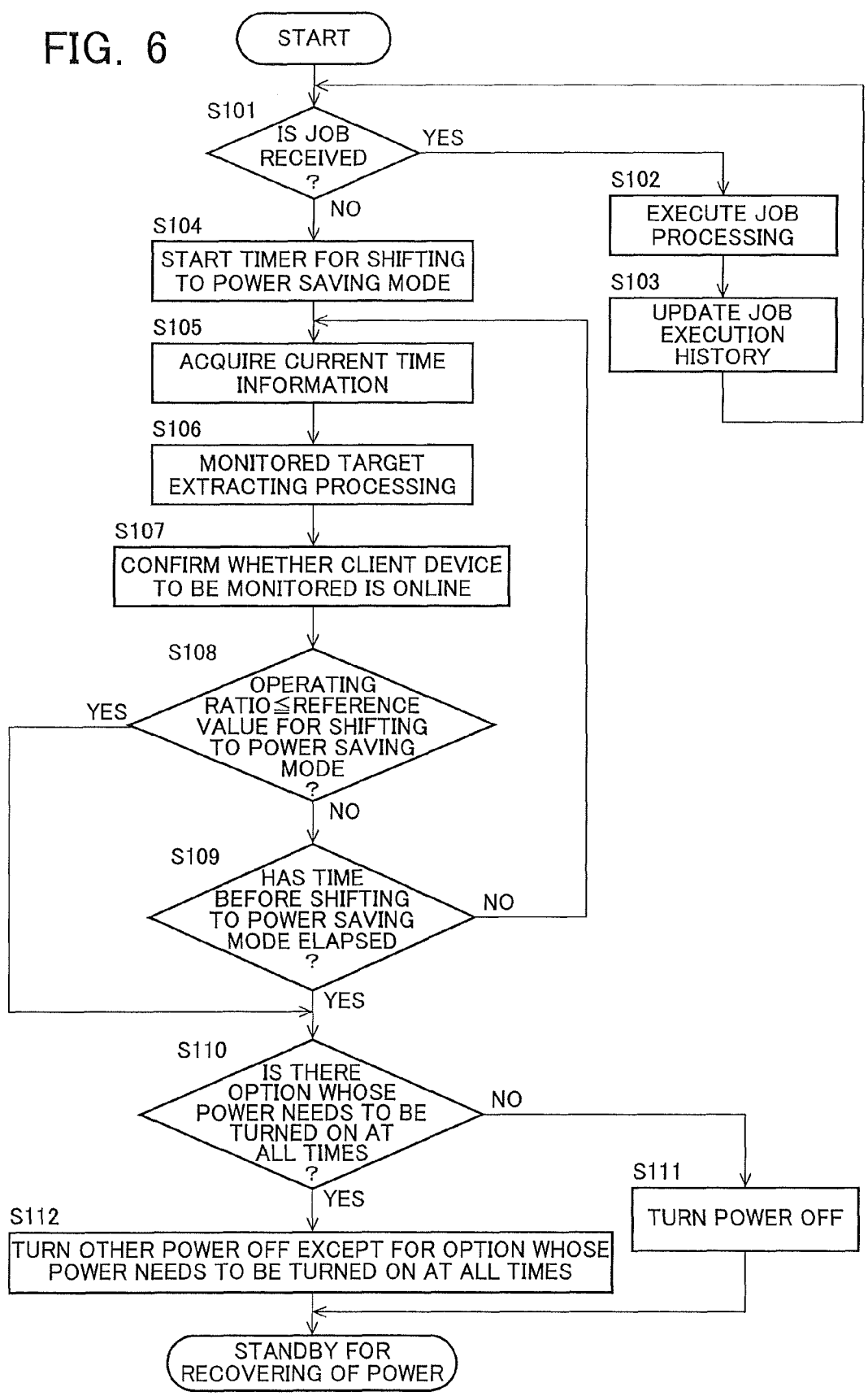
FIG. 6 is a flowchart for describing an operation flow of an image processing apparatus.
Figure 7:
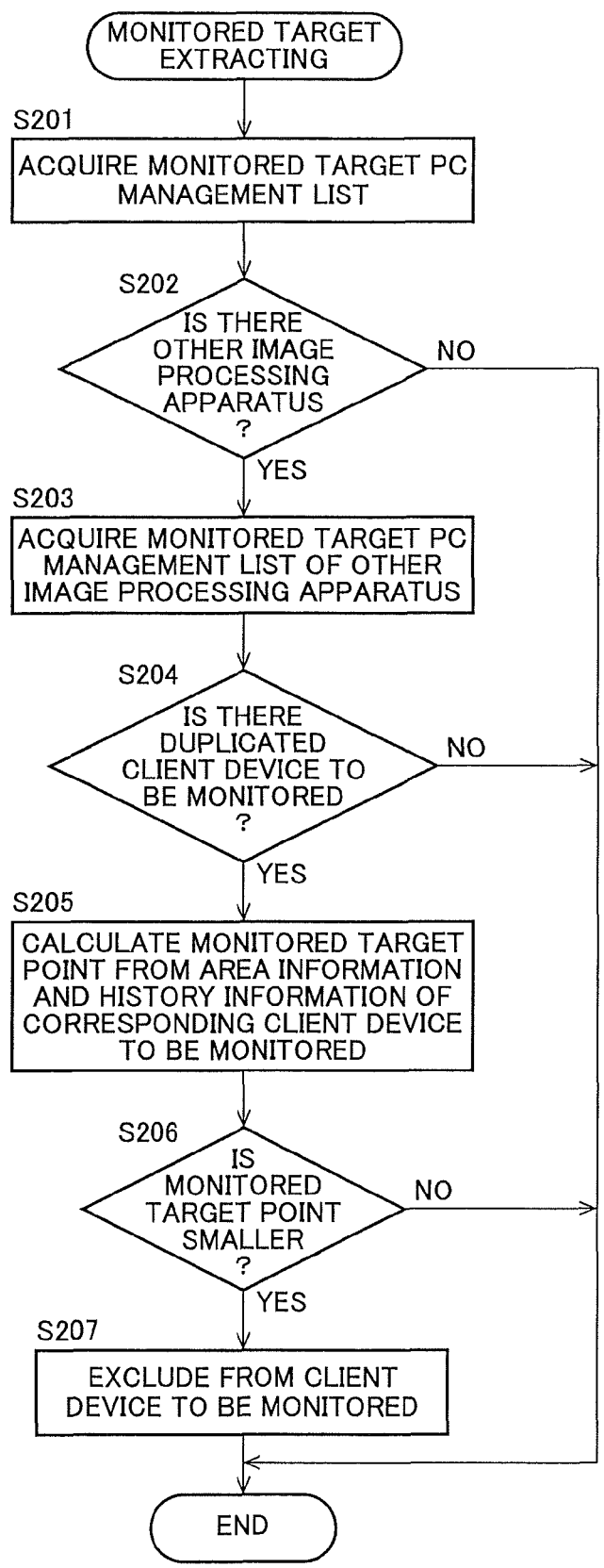
FIG. 7 is a flowchart for specifically describing monitored target extracting processing shown in FIG. 6.

An operation flow of the image processing apparatus 2 will be described below in detail with reference to FIG. 6 and FIG. 7. FIG. 6 is a flowchart for describing an operation flow of the image processing apparatus 2. FIG. 7 is a flowchart for specifically describing monitored target extracting processing shown in FIG. 6.

When power of the image processing apparatus 2 is turned on and series of processing start, the image processing portion 28 of the image processing apparatus 2 judges whether or not image data is received (step S101). When it is judged that image data is received (in the case of YES at step S101), then the image processing portion 28 performs processing (such as printing) of the received image data (step S102), updates a job execution history in the monitored target PC management list 31, and executes processing of step S101 again (step S103).

On the other hand, when it is judged that no image data is received (in the case of NO at step S101), the image processing portion 28 causes the timer count portion 22 to start a timer for measuring a time up to shifting to the power saving mode (step S104), and then acquires information of a current date and time (step S105).

Next, the monitored target extracting portion 24 performs processing for extracting a client device to be monitored (step S106). The processing for extracting a client device to be monitored will be described with reference to FIG. 7.

When the monitored target extracting processing starts, the monitored target extracting portion 24 performs processing for acquiring the monitored target PC management list 31 from the storage portion 23 (step S201). Then, the monitored target extracting portion 24 confirms whether or not other image processing apparatus 2 is connected to a network to which the image processing apparatus 2 is connected (step S202).

For example, the monitored target extracting portion 24 stores information of whether or not other image processing apparatus 2 is connected to the network in the storage portion 23 in advance and reads out the information to thereby confirm a presence/absence of other image processing apparatus 2. Alternatively, the monitored target extracting portion 24 transmits a network packet through the communicating portion 21 and searches whether or not there is a reply from other image processing apparatus 2 to thereby confirm a presence/absence of other image processing apparatus 2.

When other image processing apparatus 2 is not connected to the network (in the case of NO at step S202), the monitored target extracting portion 24 completes the monitored target extracting processing. On the other hand, when other image processing apparatus 2 is connected to the network (in the case of YES at step S202), the monitored target extracting portion 24 performs processing for acquiring the monitored target PC management list 41 from other image processing apparatus 2 (step S203).

Then, it is judged whether or not there is a client device that is regarded as a monitored target in the acquired monitored target PC management list 41 of the other image processing apparatus 2 and that is also regarded as a monitored target in the monitored target PC management list 31 of the image processing apparatus 2 in a duplicated manner (step S204).

When there is no client device regarded as a monitored target in a duplicated manner (in the case of NO at step S204), the monitored target extracting portion 24 completes the monitored target extracting processing. On the other hand, when there is a client device regarded as a monitored target in a duplicated manner (in the case of YES at step S204), a monitored target point of the corresponding client device in the monitored target PC management list 41 of the other image processing apparatus 2 and a monitored target point of the corresponding client device in the monitored target PC management list 31 of the image processing apparatus are calculated (step S205). The calculation of the monitored target point is performed with the method as illustrated in the processing for excluding a client device to be monitored.

Subsequently, the monitored target extracting portion 24 judges whether or not the monitored target point of the corresponding client device in the monitored target PC management list 31 of the image processing apparatus is smaller than that of the corresponding client device in the monitored target PC management list 41 of the other image processing apparatus 2 (step S206).

When judging that the monitored target point of the corresponding client device in the monitored target PC management list 31 of the image processing apparatus is not smaller (in the case of NO at step S206), the monitored target extracting portion 24 then completes the monitored target extracting processing. On the other hand, when judging that the monitored target point of the corresponding client device in the monitored target PC management list 31 of the image processing apparatus is smaller (in the case of YES at step S206), the monitored target extracting portion 24 performs processing for excluding the corresponding client device from the monitored target in the monitored target PC management list 31 of the image processing apparatus (step S207) and completes the monitored target extracting processing.

When the monitored target extracting processing at step S106 is completed, the status confirming portion 24 confirms whether or not the client device 1 to be monitored is online (step S107). The power saving mode shift judging portion 26 then judges whether or not the above-described operating ratio is not more than a previously set reference value for shifting to the power saving mode (step S108).

When the operating ratio is not the reference value for shifting to the power saving mode or less (in the case of NO at step S108), the timer count portion 22 judges whether or not a previously set time before shifting to the power saving mode has elapsed (step S109). When it is judged that such a time has not elapsed (in the case of NO at step S109), then the processing of step S105 is executed.

When it is judged the previously set time before shifting to the power saving mode has elapsed (in the case of YES step S109), or when the operating ratio is not more than the reference value for shifting to the power saving mode (in the case of YES at step S108), the power controlling portion 27 performs processing for shifting to the power saving mode (step S110, step S111, step S112).

Specifically, the power controlling portion 27 judges whether or not there is an option whose power needs to be turned on at all times (for example, a FAX unit or the like) in the image processing apparatus 2 (step S110). When there is not such an option (in the case of NO at step S110), the power controlling portion 27 turns power off (step S111). When there is such an option (in the case of YES at step S110), the power controlling portion 27 turns other power off except for the option (Step S111).

Note that, though description has been given centering on embodiments of an image processing apparatus, an image processing system, and a power saving shift controlling method, the present invention is not limited to these embodiments, and may have a form as a computer program for realizing a function of the image processing apparatus or a function of the image processing system or a computer program for causing a computer to execute the power saving shift controlling method, and further, may have a form of a computer-readable recording medium having the computer program recorded therein.

Here, the recording medium may be in any form of a disk type (for example, a magnetic disk, an optical disk and the like), a card type (for example, a memory card, an optical card and the like), a semiconductor memory type (for example, a ROM, a non-volatile memory and the like), a tape type (for example, a magnetic tape, a cassette tape and the like), and the like.

Reduction of costs and improvement in portability or versatility can be facilitated by recoding the computer program for realizing a function of the image processing apparatus or a function of the image processing system according to the present invention or a compute program for causing a computer to execute the power saving shift controlling method as described above in the recording medium for distribution.

In addition, the above-described recoding medium is mounted to a computer, a computer program recorded in the recording medium is read out by the computer and stored in a memory, and the computer program is read out from the memory and executed by a processor (CPU: Central Processing Unit) provided in the computer, so that it is possible to realize a function of the image processing apparatus or a function of the image processing system according to the present invention and to execute the power saving shift controlling method.

As described above, according to the present invention, information of a position relation between each client device and the relevant image processing apparatus is stored, a client device to be monitored whether or not to be online is extracted from each client device based on information including at least information concerning the position relation, whether or not the extracted client device is online is confirmed, whether or not to shift the image processing apparatus to a power saving mode is judged based on the confirmation result, and shifting to the power saving mode of the image processing apparatus is controlled based on the judgment result, so that even when a client device that has a physically remote distance from the image processing apparatus and hardly has a possibility of requesting a job is connected to the image processing apparatus through a network and the client device is being online, it is possible for the image processing apparatus to shift to the power saving mode appropriately.

The invention claimed is:

1. An image processing apparatus connected to a plurality of client devices through a network, comprising:
    a position information storage portion for storing information of a position relation between each of the client devices and the image processing apparatus;
    a history storage portion for storing information of a usage history of each of the client devices;
    a monitored target extracting portion for extracting, from among the client devices, a client device to be monitored based on information including at least the information of the position relation and the information of the usage history;
    a status confirming portion for confirming whether or not the client device extracted by the monitored target extracting portion is online;
    a power saving mode shift judging portion for judging whether or not to shift the image processing apparatus to a power saving mode based on a confirmation result by the status confirming portion; and
    a power controlling portion for controlling shifting to the power saving mode of the image processing apparatus based on a judgment result by the power saving mode shift judging portion;
    wherein the information of the usage history includes information of a time when a last request of image processing was received from each of the client devices and information of the number of times a request of image processing was received from each of the client devices.

2. The image processing apparatus as defined in claim 1, wherein the monitored target extracting portion shares information of the client device to be monitored with other image processing apparatus connected through the network.

3. The image processing apparatus as defined in claim 2, wherein the monitored target extracting portion, when a client device to be monitored by the image processing apparatus and a client device to be monitored by the other image processing apparatus are duplicated, judges whether or not to exclude the client device that is duplicated from a monitored target.

4. The image processing apparatus as defined in claim 3, wherein the monitored target extracting portion, when a client device to be monitored by the image processing apparatus and a client device to be monitored by the other image processing apparatus are duplicated, judges whether or not to exclude the client device that is duplicated from a monitored target based on information of a position relation between each of the client devices and the image processing apparatus, information of a time when a last request of image processing was received from each of the client devices, and information of the number of times a request of image processing was received from each of the client devices.

5. The image processing apparatus as defined in claim 1, wherein the power controlling portion controls shifting to the power saving mode by controlling power supply and power-off for each element constituting the image processing apparatus based on information of an apparatus configuration of the image processing apparatus.

6. The image processing apparatus as defined in claim 1, further comprising a measuring portion for measuring a current time, and wherein the monitored target extracting portion changes a condition of extracting a client device to be monitored based on information of a time measured by the measuring portion, and extracts a client device to be monitored based on the changed condition.

7. The image processing apparatus as defined in claim 1, wherein the power saving mode shift judging portion judges whether or not to shift the image processing apparatus to the power saving mode based on an operating ratio of the client device extracted by the monitored target extracting portion.

8. The image processing apparatus as defined in claim 7, further comprising a power saving mode shift time storage portion for storing a previously set time before shifting to the power saving mode, and wherein when the operating ratio is not more than a previously set threshold, the power saving mode shift judging portion judges to shift the image processing apparatus to the power saving mode, and when the power saving mode shift judging portion judges to shift the image processing apparatus to the power saving mode, the power controlling portion controls the image processing apparatus to shift to the power saving mode even when the time stored in the power saving mode shift time storage portion has not elapsed.

9. A power saving mode shift controlling method for controlling shifting to a power saving mode of an image processing apparatus connected to a plurality of client devices through a network, comprising:
    a position information storage step for storing information of a position relation between each of the client devices and the image processing apparatus;
    a history storage step for storing information of a usage history of each of the client devices;
    a monitored target extracting step for extracting, from among the client devices, a client device to be monitored based on information including at least the information of the position relation and the information of the usage history;

a status confirming step for confirming whether or not the client device extracted by the monitored target extracting portion is online;

a power saving mode shift judging step for judging whether or not to shift the image processing apparatus to a power saving mode based on a confirmation result by the status confirming portion; and a power controlling step for controlling shifting to the power saving mode of the image processing apparatus based on a judgment result by the power saving mode shift judging portion;

wherein the information of the usage history includes information of a time when a last request of image processing was received from each of the client devices and information of the number of times a request of image processing was received from each of the client devices.

10. The power saving mode shift controlling method as defined in claim 9, wherein at the monitored target extracting step, information of the client device to be monitored is shared with other image processing apparatus connected through the network.

11. The power saving mode shift controlling method as defined in claim 10, wherein at the monitored target extracting step, when a client device to be monitored by the image processing apparatus and a client device to be monitored by the other image processing apparatus are duplicated, whether or not to exclude the client device that is duplicated from a monitored target is judged.

12. The power saving mode shift controlling method as defined in claim 11, wherein at the monitored target extracting step, when a client device to be monitored by the image processing apparatus and a client device to be monitored by the other image processing apparatus are duplicated, whether or not to exclude the client device that is duplicated from a monitored target is judged based on information of a position relation between each of the client devices and the image processing apparatus, information of a time when a last request of image processing was received from each of the client devices, and information of the number of times a request of image processing was received from each of the client devices.

13. The power saving mode shift controlling method as defined in claim 9, wherein at the power controlling step, shifting to the power saving mode is controlled by controlling power supply and power-off for each element constituting the image processing apparatus based on information of an apparatus configuration of the image processing apparatus.

14. The power saving mode shift controlling method as defined in claim 9, further comprising a measuring step of measuring a current time, and wherein at the monitored target extracting step, a condition of extracting a client device to be monitored is changed based on information of a time measured at the measuring step, and a client device to be monitored is extracted based on the changed condition.

15. The power saving mode shift controlling method as defined in claim 9, wherein at the power saving mode shift judging step, whether or not to shift the image processing apparatus to the power saving mode is judged based on an operating ratio of the client device extracted at the monitored target extracting step.

16. The power saving mode shift controlling method as defined in claim 15, further comprising a power saving mode shift time storage step of storing a previously set time before shifting to the power saving mode, and wherein at the power saving mode shift judging step, when the operating ratio is not more than a previously set threshold, it is judged to shift the image processing apparatus to the power saving mode, and when it is judged to shift the image processing apparatus to the power saving mode at the power saving mode shift judging step, the image processing apparatus is controlled to shift to the power saving mode at the power controlling step, even when the time stored at the power saving mode shift time storage step has not elapsed.

17. An non-transitory computer-readable recording medium having a computer program that realizes a power saving mode shift controlling method for controlling shifting to a power saving mode of an image processing apparatus connected to a plurality of client devices through a network, the power saving mode shift controlling method comprising:

a position information storage step for storing information of a position relation between each of the client devices and the image processing apparatus;

a history storage step for storing information of a usage history of each of the client devices;

a monitored target extracting step for extracting, from among the client devices, a client device to be monitored based on information including at least the information of the position relation and the information of the usage history;

a status confirming step for confirming whether or not the client device extracted by the monitored target extracting portion is online;

a power saving mode shift judging step for judging whether or not to shift the image processing apparatus to a power saving mode based on a confirmation result by the status confirming portion; and a power controlling step for controlling shifting to the power saving mode of the image processing apparatus based on a judgment result by the power saving mode shift judging portion;

wherein the information of the usage history includes information of a time when a last request of image processing was received from each of the client devices and information of the number of times a request of image processing was received from each of the client devices.

* * * * *